May 11, 1943.   P. A. VOIGT ET AL   2,318,820
BUILDING CONSTRUCTION
Filed June 4, 1938   2 Sheets-Sheet 1
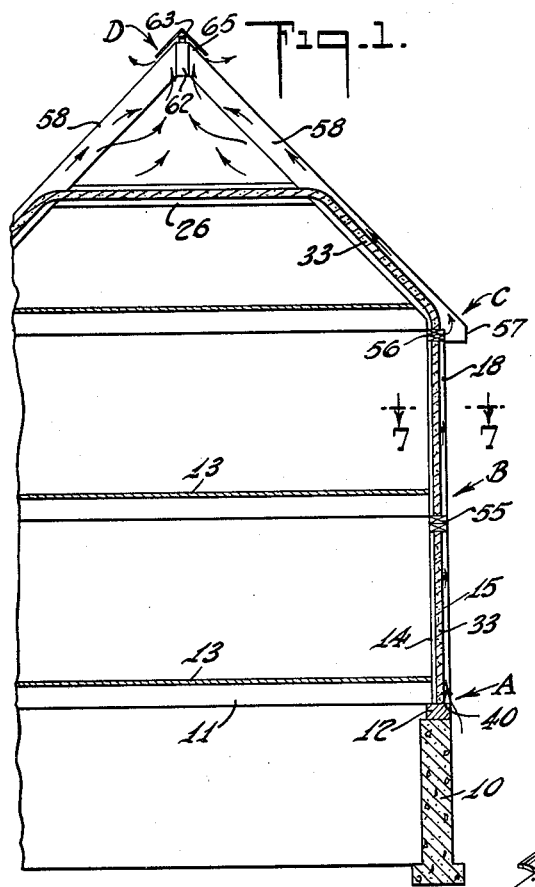
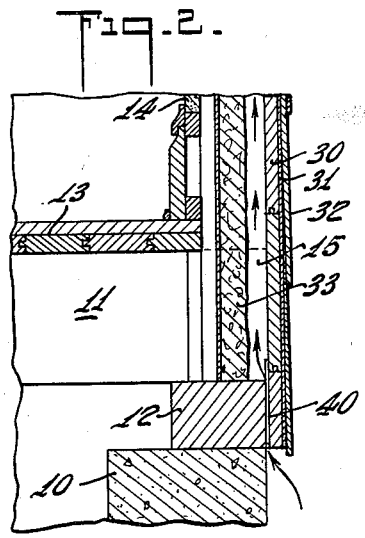
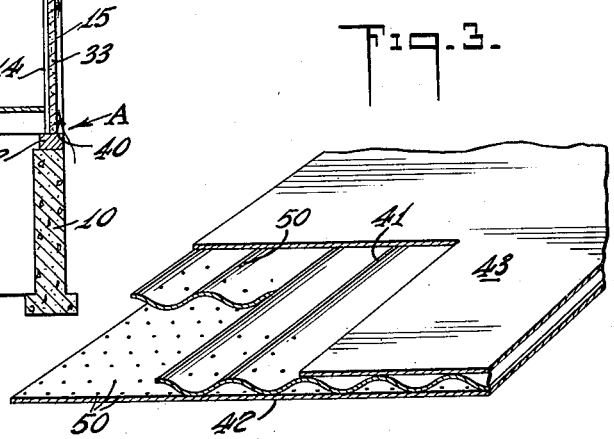
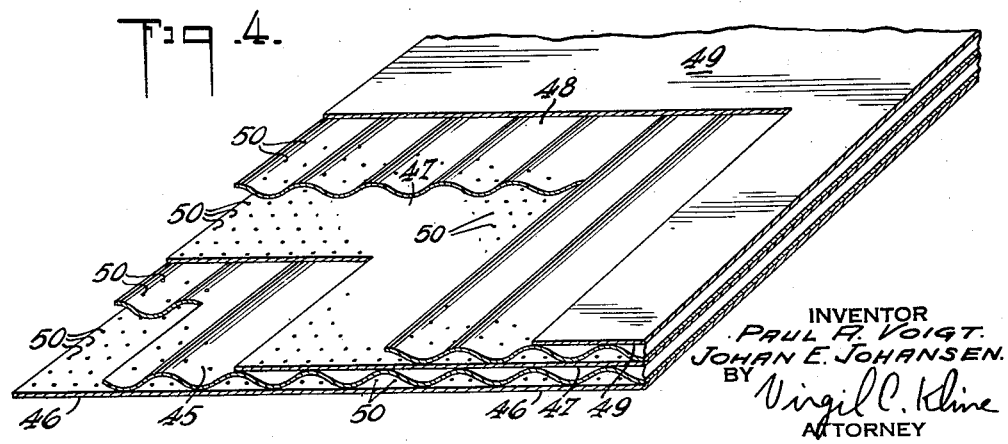
INVENTOR
PAUL A. VOIGT.
JOHAN E. JOHANSEN.
BY Virgil C. Kline
ATTORNEY

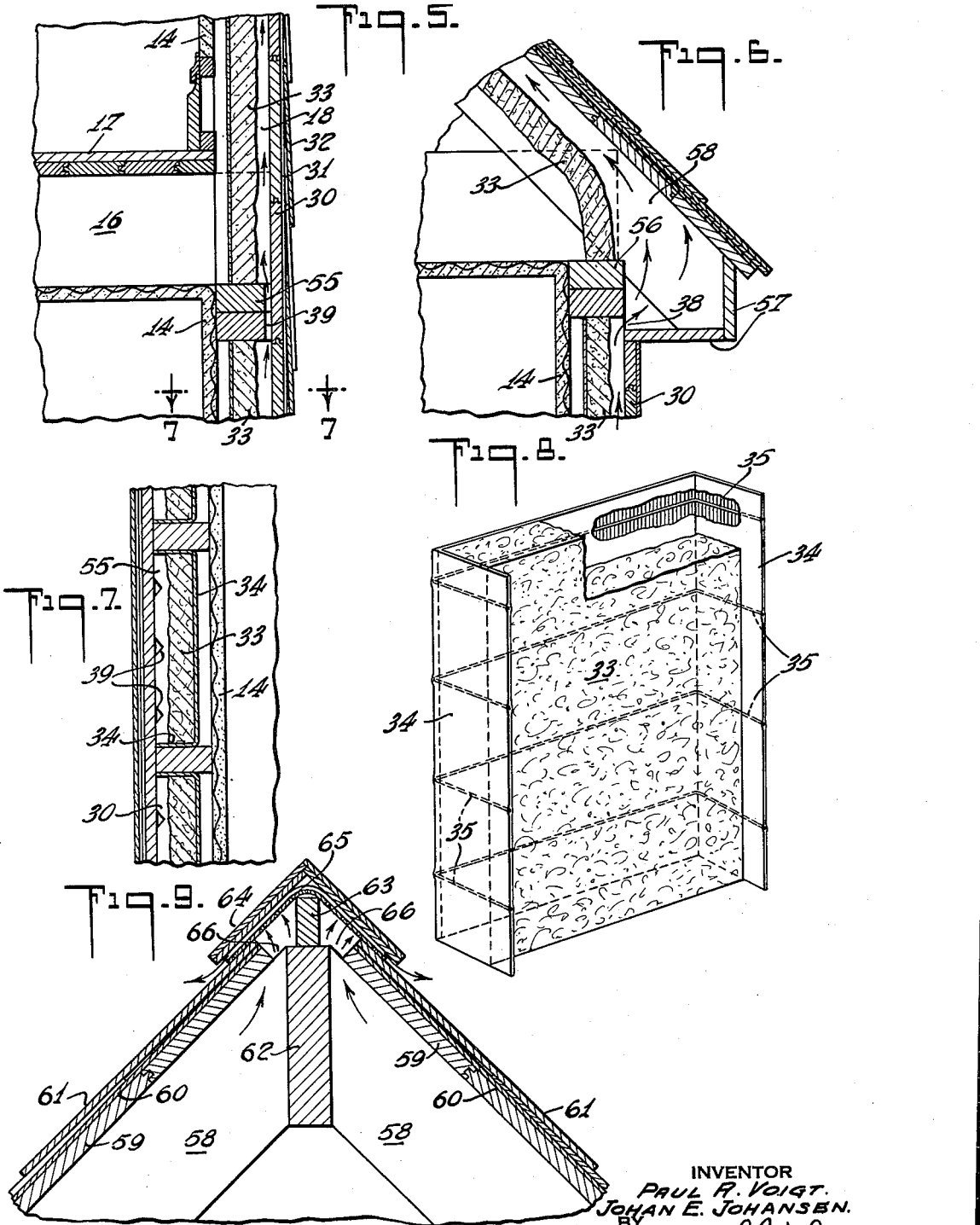

Patented May 11, 1943

2,318,820

UNITED STATES PATENT OFFICE 2,318,820

BUILDING CONSTRUCTION

Paul A. Voigt, Bellerose Manor, and Johan E. Johansen, Brooklyn, N. Y., assignors to Johns-Manville Corporation, New York, N. Y., a corporation of New York Application June 4, 1938, Serial No. 211,708

8 Claims. (Cl. 20—1)

The present invention relates to improvements in building structures, particularly those having thermal insulating material incorporated in their wall and roof or attic structures.

Houses and similar types of buldings of frame or other conventional hollow wall constructions have frequently been found to have a considerable amount of moisture present within their walls. It is believed that the presence of the water, in many instances, is the result of leaks occurring in the outer sheathing particularly adjacent the eaves of the house, the moisture trickling down within the walls. Such leaks are difficult of ascertainment and often do not make themselves known until the interior of the walls are exceedingy damp. It is also thought that the presence of the water in some instances is, at least in part, due to the condensation of moisture from the air within the walls. Thus, in localities which experience very cold winter weather and where the interior of the house is maintained at the temperature and relative humidity required for proper living conditions, the air in the interior of the house contains a relatively large amount of water vapor. In the absence of a complete vapor seal, the water vapor may filter into the walls raising the moisture content of the air confined therein above the dew point, particuarly at the low temperatures adjacent the outer side of the wall. As a result, the water vapor condenses, depositing water within the wall.

Particularly where the building walls are insulated, for example, with mineral wool or other porous materials, the presence of moisture and/or moisture-laden air in the walls has been found to give rise to numerous deleterious effects. For example, the moisture inevitably enters the porous insulating material, whereby the latter eventually becomes saturated with water to greatly impair its insulating efficiency. Moreover, in cold climates there is a tendency for the water to freeze within the insulation, with consequent destructive effects on the same. In addition, moisture within the walls has been found to cause rotting of the studding and other frame members, as well as to cause moist spots in the plaster covering the inner wall surfaces.

The present invention is particularly concerned with the elimination of the above-noted difficulties heretofore encountered, and has for its principal object the provision of means to insure the evaporation of the moisture and the escape of the moisture-laden air which accumulates within building walls and the like.

The foregoing object is attained by the invention, which, in its broader phase, resides in the provision of ventilating means so arranged that a circulation of air will result throughout the walls of the structure to permit the ready drying out of the same, and of insulation, if employed therein, in the event of moisture or moisture-laden air accumulating within the walls.

It is a further object of the invention to provide a structure of the type described above which will provide adequate ventilation of the walls and the roof or attic of a building structure without detracting from the normal weather-proofness of the outer wall sheathing, and further, to provide a ventilating means having the above characteristics, which in no way detracts from the appearance of the wall or roof structure.

A still further object of the invention is the provision of an arrangement of the insulating material within a wall having vertically spaced ventilating openings which will permit ready passage of the air between the ventilating openings.

The invention and the manner in which it attains all of the foregoing objects will be fully understood and further advantages and functions thereof will become apparent when reference is made to the more detailed description thereof which is to follow and to the accompanying drawings in which:

Fig. 1 is a diagrammatic sectional view illustrating a frame building construction incorporating the preferred forms of our invention therein;

Fig. 2 is an enlarged sectional detail view of the portion of the structure indicated at A in Fig. 1;

Fig. 3 is a perspective view with parts broken away for the purpose of illustration depicting a ventilating member for use in connection with the present invention;

Fig. 4 is a view similar to that of Fig. 3 depicting a modified form of ventilating member;

Fig. 5 is an enlarged sectional view of the portion of the structure indicated at B in Fig. 1;

Fig. 6 is an enlarged sectional view of the portion of the structure indicated at C in Fig. 1;

Fig. 7 is an enlarged detail sectional view taken horizontally through the wall structure on the line 7—7 of Fig. 1;

Fig. 8 is a perspective view illustrating one form of insulating batt and spacing means therefor which may be employed in a structure incorporating the invention; and Fig. 9 is an enlarged sectional view of the portion of the structure indicated at D in Fig. 1.

Referring now to the drawings, and more particularly to Fig. 1, a house of conventional frame construction is diagrammatically depicted. A two-story frame house with a full attic is shown for the purposes of illustration, but it will be understood that the invention is in no way limited to this particular structure and that it may be incorporated in houses and other buildings of any number of stories and of conventional types.

In accordance with the invention, the hollow walls of the building of Fig. 1, namely, the spaces provided between upright frame members or studs 15, are vented as at 40 to the outer air and air passageways are formed to provide communication between the hollow wall spaces defined by the studs 15 and the similar spaces in the second floor wall defined by studs 18. Furthermore, communicating channels are provided between the spaces in the second story walls and the attic, if the latter is unceiled, or the spaces between the rafters 58, if a ceiling is provided for the same. Finally, air venting means open to the atmosphere is located adjacent the ridge of the roof as indicated at 65. Thermal insulating material 33 is preferably employed between the walls, the insulating material being so disposed or of such nature as to permit the ready passage of air within the walls.

The continuous air passageway thus provided, communicating with the atmosphere adjacent the base of the wall and adjacent the peak or ridge of the roof, gives rise to a continuous movement or current of air within the walls and the roof or attic in a direction as indicated by the arrows. As will be readily understood, this air current exerts a drying effect by evaporation of moisture which may have found its way within the walls and by conveying such evaporated moisture, and other moisture-laden air which may be present, through the ridge venting device and to the atmosphere. However, as will be understood particularly from a consideration of the following detailed description of the preferred embodiments of the specific features of the invention, the weather resistance of the building walls is in no way lessened nor is the appearance of the building altered nor do any other deleterious effects result from the use of the invention.

Referring now particularly to Figs. 1 to 3, 5 and 7, the structure shown comprises suitable foundations 10 carrying on their upper edges floor plates or stringers 12. Supported by the floor plates are the first floor joists 11, which, in turn, carry the flooring 13. The wall structure, in accordance with the conventional practice, comprises the vertical studs 15 suitably secured at their lower ends to the plate 12 and extending to upper plates 55 defining the upper limit of the first floor. To the vertical studs are nailed suitable sheathing 30 which may comprise shiplap or any other conventional material employed for this purpose. Over the sheathing is preferably applied a moisture-proof layer, comprising, for example, an asphalt-saturated felt 31. The exterior of the wall may be covered with any conventional type of weather facing elements 32 such as shingles, clapboards, bricks, or the like. The interior wall surface may comprise any suitable finishing such as the conventional lath and plaster indicated at 14.

The hollow wall structure between the studs 15, in accordance with preferred practice, carries the thermal insulating material indicated at 33, which may comprise batts of mineral wool or of other conventional insulating materials, such batts being preferably supported in a manner to space the faces of the same from the outer sheathing structure as will be hereinafter more fully explained. It will be understood, however, that the present invention does not require the use of insulation in batt form or the spacing of the insulation from the wall, if the insulating material is of sufficiently porous structure to permit the ready passage of air vertically of the walls. For example, the walls may be filled with nodulated mineral wool or other similar types of insulation which are not packed down to such an extent as to substantially impede air passage.

In accordance with the present invention, the air inlet means 40 is located at the base of the wall between the plate 12 and the outer sheathing 30. The means 40 consists of venting material in sheet form having air passageways extending therethrough. One form of venting material particularly suitable is illustrated in detail in Fig. 3, and comprises facing members 42 and 43, preferably formed of an asphalt-saturated, asbestos felt material, and a corrugated core member 41 located between the facing members. The corrugated core may similarly comprise asbestos felt, but in lieu of, or in addition to, the asphalt impregnant, it has incorporated in it a suitable hardening binder having the ability to maintain the core in its corrugated form, irrespective of compressive forces which may be applied to the faces of the sheets 42 and 43. Hardening impregnants which have been found most suitable for this purpose comprise phenolic resins, for example, Bakelite resins. However, any of the many known types of hardening and stiffening impregnants may be employed, the particular material adapted for this purpose being a matter within the skill of the artisan. The several components of the venting material are preferably secured together, for example, by adhesive means which may comprise the impregnating materials.

A modified form of venting material is illustrated in Fig. 4. The construction shown in this figure is similar to that of Fig. 3 in that it comprises a facing member 46, a corrugated core member 45, and a second planer facing member 47. In this form of the construction, however, an additional core member 48 is secured to the other face of the member 47, and an outer facing member 49 is provided for the second core member.

In both forms of the venting material the longitudinal fluting, formed by the corrugated members, provides passageways for air. Also, both forms of the venting material, at least when the same are to be employed at certain locations in the building structure, have elements thereof pierced at closely spaced points to provide a multiplicity of closely spaced perforations 50 extending therethrough. The perforations may range in diameter from say $1/50$ to $1/25$ of an inch, whereby air and moisture vapor may readily penetrate the same, but the water resistance of the elements is in no way lessened. In the material illustrated in Fig. 3, such fine perforations 50 are provided in the lower facing sheet 42, i. e., the facing sheet which is to be innermost when the material is employed, and preferably also in the corrugated core member 41. In the device of Fig. 4 the perforations are similarly placed in the lower facing sheet 46 and core member 45, and also in the intermediate planer sheet 47 and second core member 48. The outer facing sheets in each instance will be preferably unperforated. The perforations are provided to permit the ready passage of air and water vapor laterally into the corrugations or flutings in certain uses of the venting material, as will be hereinafter fully explained. The venting material may be made up in the form of large flat sheets or may be of continuous lengths and supplied in roll form. Alternatively, the venting material may be cut into sheets of suitable dimensions for the particular use for which they are to be employed prior to their delivery to the job.

Referring again to Fig. 2, the air inlet device 40 comprises either of the venting materials shown in Figs. 3 or 4 dimensioned to extend from approximately the lower edge of the sheathing to the upper face of plate 12 or slightly above the same and located to have the corrugations of its core member extending vertically of the wall. The air inlet device may consist of sections of the venting material placed at intervals in conformity with the spacing between the studs, but preferably is provided as a continuously extending member. The air inlet device 40 is secured between the plate 12 and sheathing in any suitable manner, for example, by nailing the same in position.

The provision of the air inlet device, as thus described, provides a ready passageway for air into the spaces between studs of the hollow wall construction, inasmuch as the ends of the flutings or corrugations are exposed to the outer air and to the interior wall spaces, respectively. By this means, the air may readily pass upwardly between the insulating material and the sheathing or within the insulating material itself. The perforations 50, previously described, serve no necessary purpose in this use of the venting material and may be omitted.

Preferably, the insulating material 33 is maintained in spaced relationship to the outer wall sheathing. One form of construction which may be advantageously employed for this purpose is illustrated in Figs. 7 and 8. In said figures, insulation in batt form is illustrated which may be mineral wool, wood fibres, or any other suitable and conventional insulating material. A liner 34 is provided extending around the face and the two side edges of the batt, the liner preferably comprising paper or a similar substantially airimpermeable material. The liner is formed to include suitable reenforcing wires 35 in its composition, the wires preferably lying within or between laminations of the paper, the wires and also preferably the lining paper extending beyond the exposed face of the batt. The batts, when positioned between the studs as illustrated in Fig. 7, are held in substantially fixed relationship therein by the wires 35 which resiliently engage the studs and which, at the same time, by means of their extension beyond the outer face of the batt, contact the sheathing and prevent resting of the insulating batt against the same. The liner member forms a substantially air and moistureimpervious facing for the inner faces of the batts and serves to prevent the ready passage of moisture, which may penetrate the plaster finish 14, to the insulating material. The supporting means for the insulating batts disclosed in Fig. 7 has been found to be particularly suitable, but it will be understood that other supporting devices functioning in a similar manner may be employed in lieu thereof. For example, patent to Harry W. MacKechnie, No. 2,239,394, issued April 22, 1941, illustrates other suitable forms of batt securing means which may be employed to provide the desired spacing of the batts from the sheathing members.

Referring now to Fig. 5, there is illustrated a portion of the wall structure adjacent the second floor of the building. Conventionally, the wall structure at this point comprises plates 55 resting on the upper ends of the lower floor studs 15, the plates 55, in turn, supporting joists 16 for the second floor. The joists 16 carry flooring material 17. The plate members 55 also support studs 18 extending the height of the second floor. The sheathing 30, the felt paper 31, and the outer weather facing covering 32 may be continued, as is conventional, to cover the outer surface of the walls of the second story. Between the studs of the second floor construction, batts 33 of the insulation are provided, or other suitable forms of insulating materials are employed as in the previously described wall structure. To continue the air passageway, suitable openings are provided in or adjacent the plate 55. For example, the plates may be notched at suitable intervals, as indicated at 39. Alternatively, holes may be bored at intervals through the plates or strips of the venting material, illustrated in either Figs. 3 or 4, and with or without the perforations 50, may be inserted between the sheathing and the outer face of the plate 55, the corrugations or flutings extending vertically. Due to the relative thinness of the sheet material, it having a thickness, say, of substantially one-quarter of an inch in the case of the construction shown in Fig. 3 or onehalf an inch for that shown in Fig. 4, no perceptible bulge will be apparent in the wall structure by reason of its use.

Resting on the upper ends of the studs 18 a plate 56 is provided which supports rafters 58. In accordance with the invention, means are provided at this point to provide an air passageway between the spaces within the wall and the attic, or the space between the roof structure and the roof insulation, if such is provided. These means may take alternative forms, depending upon the particular cornice or eave structure employed. For the purposes of illustration, a box cornice is shown which comprises finishing boards 57 secured to horizontal and vertical faces, respectively, of the rafter ends. The horizontal finishing member 57 is extended to the studs 18 and secured thereto and to the sheathing in such a manner as to provide the air passageway 38. Where other types of cornice structures are employed, for example, if a type is used requiring the sheathing to continue to the plates 56, the air passageway may be provided by notches in the plates or other suitable means as described in connection with the plate 55.

The insulation 33 for the roof of the structure may be applied between the rafters 58 to provide an insulated attic or, in many instances where such is not desired, the insulation may be extended over the ceiling forming the attic floor. In the construction illustrated, the insulation is carried between the rafters and across an attic ceiling 26.

A venting device 65, located adjacent the ridge of the roof, is provided to complete the wall ventilating system. As illustrated particularly in Fig. 9, the rafters 58 have their upper ends secured to a suitable ridge member 62 in a conventional manner, the rafters carrying the usual roof boards 59, water-impervious felt 60, and shingles or the like 61. The roof boards, felt, and shingles stop short of the ridge member 62 to provide air passageways 66 as illustrated. Supported on the ridge member 62 is a second longitudinally extending member 63. Venting material, which may comprise either the material of Figs. 3 or 4, cut in suitable lengths, is placed to extend preferably continuously the length of the ridge and in overlapping relationship to the shingles on either side thereof and across the member 63 to form the device 65. The sheet material is placed to have its flutings or corrugations running from slope to slope of the roof. Secured over the venting device is any suitable ridge capping means such as the shingles indicated at 64. The venting device is, as previously stated, formed of the venting material of either Figs. 3 or 4, the lower facing sheet and the intermediate sheet, if such is employed, and also preferably the corrugated cores, in this instance, being provided with the multiplicity of minute perforations 50 as previously explained. The presence of the perforations permits air and water vapor to readily pass from the attic to the corrugations or flutings, but at the same time, the water-imperviousness of the perforated lower facing member prevents the seepage or driving of rain through the venting device and into the attic.

As will readily be observed, a construction in accordance with the invention, as described, provides a complete passageway for air from the exterior of the building through the walls and attic and again to the exterior, whereby "breathing" of the walls and attic may readily take place. Due to the air draft thus permitted, moisture, which may accumulate within the walls and attic and within the insulation, is readily vaporized and the moisture-laden air carried to the attic and vented from the device 65. Also the construction tends to inhibit formation of moisture by condensation inasmuch as the relative humidity of the moisture-laden air is lowered by intermingling with the relatively dry air entering from the exterior of the building and by the rapid removal of the air through the venting device. However, by reason of the structure of the air inlet and venting devices, no loss in the weather-resistance of the building structure results nor is the appearance of the same altered, the air inlet and venting devices being, for all practical purposes, invisible except upon close inspection.

It will, of course, be understood that although the description has been with reference to one vertical wall of the building, a similar construction is preferably employed for all its exterior walls. Where the spaces defined by the studs 15 or 18 are interrupted, for example, by windows and the like, the spaces thus closed off may be readily vented to adjacent continuous spaces as by notching the studs defining the closed off spaces adjacent the top or the bottom of the latter or both as the case may be.

In the event that insulating materials are employed only in the attic of the building, the circulation of air through the walls may be omitted. In this case, it has been determined that the provision of the venting device adjacent the ridge or peak of the roof is in most instances alone adequate to prevent the accumulation of moisture in the attic.

Having thus described the invention in rather full detail, it will be understood that these details need not be strictly adhered to, but that numerous changes and modifications will suggest themselves to those skilled in the art, all falling within the scope of the invention as defined by the subjoined claims.

What we claim is:

1. In combination with a wooden frame building structure including a top attic space and a wall comprising a foundation sill, a foot plate and a header plate upon which is secured a sheathing and siding on the outside and an interior finish upon the inner side, insulation within the wall between the sheathing and the siding and the interior finish allowing a passageway between the sheathing and siding and the insulation, and means for separating the sheathing from the sill, foot plate, and header plate to provide for circulation of air from the outdoors into the wall at the foundation sill and up between the sheathing and the sill, foot plate and header plate into the attic space of the building structure.

2. In combination with a wooden frame building structure including a top attic space and a wall comprising a foundation sill, a foot plate and a header plate upon which is secured a sheathing and siding on the outside and an interior finish upon the inner side, insulation within the wall between the sheathing and siding and the interior finish allowing a passageway between the sheathing and siding and the insulation, and means for separating the sheathing from the sill, foot plate, and header plate to provide for circulation of air from the outdoors into the wall at the foundation sill and up between the sheathing and the sill, foot plate and header plate into the attic space of the building structure, the building structure being provided with means to allow for air escape from the attic space at the upper portion of such space.

3. In combination with a wooden frame building structure including a top attic space, a wall and a foundation, a foot member on said foundation, a header plate, a sheathing and siding on the outside of said wall, and an interior finish on the inner side thereof, insulation within the wall between the sheathing and the interior finish allowing a passageway between the sheathing and the insulation, and means for separating the sheathing from the foot member and header plate to provide for circulation of air from the outdoors into the wall at the foot member and up between the sheathing and foot member and header plate and into the attic space of the building structure.

4. In combination with a wooden frame building structure including a top attic space, a wall and a foundation, a foot member on said foundation, a header plate, a sheathing and siding on the outside of said wall, and an interior finish on the inner side thereof, insulation within the wall between the sheathing and the interior finish allowing a passageway between the sheathing and the insulation, and means for separating the sheathing from the foot member and header plate to provide for the circulation of air from the outdoors into the wall at the foot member and up between the foot member and header plate into the attic space of the building structure, the building structure being provided with means to allow for air escape from the attic space in the upper portion of such space.

5. In combination with a building structure including a top attic space, a wall and a foundation, a foot member on said foundation, a header plate, a sheathing and siding on the outside of said wall and an interior finish on the inner side thereof, insulation within the wall between the sheathing and the interior finish allowing a passageway between the sheathing and the insulation, and means for separating the sheathing from the foot member and header plate to provide for circulation of air from the outdoors into the wall at the foot member and up between the sheathing and foot member and header plate and into the attic space of the building structure, said means for separating the sheathing from the foot member comprising a corrugated member interposed beneath said exterior covering and terminating adjacent the lower edge thereof and having its corrugations extending vertically.

6. In combination with a building structure including a top attic space, a wall and a foundation, a foot member on said foundation, a header plate, a sheathing and siding on the outside of said wall and an interior finish on the inner side thereof, insulation within the wall between the sheathing and the interior finish allowing a passageway between the sheathing and the insulation, means for separating the sheathing from the foot member, said means comprising a laminated structure including a corrugated core sheet secured to facing sheets, with the corrugations of the core sheet extending vertically, and means for separating the sheathing from the header plate, said construction providing for circulation of air from the outdoors into the wall at the foot member and up between the sheathing and foot member and header plate and into the attic space of the building construction.

7. In combination with a building structure including a top attic space, a wall and a foundation, a foot member on said foundation, a header plate, a sheathing and siding on the outside of said wall and an interior finish on the inner side thereof, insulation within the wall between the sheathing and the interior finish allowing a passageway between the sheathing and the insulation, and means for separating the sheathing from the foot member and header plate to provide for circulation of air from the outdoors into the wall at the foot member and up between the sheathing and foot member and header plate and into the attic space of the building structure, said means separating the sheathing from the foot member comprising a laminated structure including a stiffened moisture-resistant corrugated asbestos core sheet secured to moisture-resistant asbestos facing sheets, with said corrugations of the core sheet extending vertically.

8. A building wall structure comprising spaced supporting members, exterior sheathing secured to said supporting members, insulating material disposed within the space defined by said supporting members and sheathing and spaced from said sheathing, said insulating material being in batt form and including a covering overlying a face and two sides of the batt to leave uncovered that face of the batt nearest said sheathing, and wire-like elements carried by said covering, said elements lying substantially in the plane of the covering at the side edges of the batt and projecting forwardly beyond said uncovered face into contact with said sheathing, said elements maintaining the batt in position and spacing the same from the sheathing.

PAUL A. VOIGT.
JOHAN E. JOHANSEN.